United States Patent
DeCusatis

(10) Patent No.: US 6,415,076 B1
(45) Date of Patent: Jul. 2, 2002

(54) MODE CONDITIONING PATCH FOR FACILITATING SIGNAL TRANSMISSION FROM SINGLE MODE OPTICAL FIBER TO MULTIMODE OPTICAL FIBER

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/512,249

(22) Filed: Feb. 24, 2000

(51) Int. Cl.⁷ .............................. G02B 6/14; G02B 6/26
(52) U.S. Cl. ........................................... 385/28; 385/43
(58) Field of Search .............................. 385/28, 33, 38, 385/39, 43, 123, 124, 127

(56) References Cited

U.S. PATENT DOCUMENTS

| | | | |
|---|---|---|---|
| 4,701,011 A | * 10/1987 | Emkey et al. | |
| 4,804,248 A | * 2/1989 | Bhagavatula | |
| 4,913,507 A | * 4/1990 | Stamnitz et al. | |
| 5,138,675 A | * 8/1992 | Schofield | 385/28 |
| 5,600,470 A | * 2/1997 | Walsh | 359/152 |
| 5,732,170 A | * 3/1998 | Okude et al. | 385/27 |
| 6,014,483 A | * 1/2000 | Thual et al. | 385/33 |
| 6,154,589 A | * 11/2000 | Kirk et al. | 385/29 |
| 6,185,346 B1 | * 2/2001 | Asawa et al. | 385/28 |
| 6,330,382 B1 | * 12/2001 | Harshbarger et al. | 385/28 |

OTHER PUBLICATIONS

"Intrasystem Interconnection in Telecommunication Platforms Using Plastic Optical Fiber", Gary J. Grimes, 1998 Electronic Components and Technology Conference, pp. 981–986 (no month avail.).

"Graded Index Plastic Optical Fibers: Quo Vadis?", Victor Ilyashenko and Ed Berman, 1998 Electronic Components and Technology Conference, pp. 987–991 (no month avail.).

* cited by examiner

*Primary Examiner*—Rodney Bovernick
*Assistant Examiner*—Michael J. Stahl
(74) *Attorney, Agent, or Firm*—Lily Neff, Esq.; Floyd A. Gonzalez, Esq.; Heslin Rothenberg Farley & Mesiti P.C.

(57) ABSTRACT

A mode conditioning patch (MCP) is provided for conditioning a single mode fiber optic signal for propagation within a multimode optical fiber. The MCP includes a single mode optical fiber section and a transition region with increasing diameter. The transition region diameter preferably increases to approximately that of a multimode fiber section through which the conditioned signal is to propagate. In one embodiment, the transition region is a flared end of the single mode optical fiber section, which is fabricated of plastic. The single mode optical fiber section with the flared end can be fusion splice joined to the multimode optical fiber section to further enhance mixing of the single mode signal within the multimode fiber optic section.

24 Claims, 2 Drawing Sheets

MODE CONDITIONING PATCH FOR FACILITATING SIGNAL TRANSMISSION FROM SINGLE MODE OPTICAL FIBER TO MULTIMODE OPTICAL FIBER

TECHNICAL FIELD

This invention relates in general to fiber optics, and in particular, to an optical mode conditioner for efficiently conditioning a single mode optical signal propagating in a single mode optical fiber or launched from a single mode laser transmitter for propagation within a multimode optical fiber.

BACKGROUND OF THE INVENTION

Fiber optic data links for many computing platforms have traditionally been one of two varieties, i.e., multimode fiber or single mode fiber. With a single mode fiber, light is launched down the axis of the fiber, and with a multimode fiber light propagates down the axis and also bounces back and forth at many different angles within the fiber. Multimode fiber has a larger core size, for example, 50 or 62.5 $\mu$m in diameter, compared with single mode fiber, for example, 9–10 $\mu$m in diameter. Further, multimode fibers are typically used for shorter distances, up to 3 km, while single mode fiber enables transmission of signals across longer distances, for example, up to 20 km or more. Because of the different core sizes, there are conventionally two different types of fiber optic transceivers, one for each cable type.

Recently, however, there have been a number of applications which require a single mode transceiver/card to operate over a multimode fiber. For example, in a Parallel Sysplex for an IBM S/390 system, the channel coupling links were initially offered in both multimode and single mode versions, however the multimode adapters were subsequently withdrawn. Therefore, to facilitate customers who had multimode adapters installed and wish to migrate to single mode, it is desirable to be able to reuse the installed multimode fiber with a single mode adapter card. As another example, Gigabit Ethernet is a new IEEE industry standard (no. 802.3Z) which specifically provides for operation of single mode transceivers over multimode fiber optic under certain conditions. As a further example, FICON is an IBM implementation of a fiber channel intended as replacement for ESCON, now an industry standard. Since the vast majority of ESCON links installed today use multimode fiber, it is desirable to provide a way to reuse the fiber with single mode-only FICON adapter cards, similar to the Gigabit Ethernet standard.

To address these needs, it is necessary to have a means of operating a single mode laser card over multimode fiber. A single mode laser signal cannot be directly launched into multimode fiber since the optical power will not be distributed evenly among all the modes and, a type of noise develops known as differential mode delay (DMD), which prevents the link from operating at any distance more than a few meters. In order to achieve useful distances, the signal from the single mode card must be adapted to the multimode fiber. This adaption is conventionally done using an optical mode conditioning patch cable (MCP).

The present invention is directed to providing an improved optical mode conditioning technique for implementation within an MCP for conditioning a single mode waveform for propagation within a multimode fiber.

DISCLOSURE OF THE INVENTION

Briefly described, the invention comprises in one aspect an optical mode conditioner which includes a single mode fiber optic section having a diameter x and a flared end with a diameter y, wherein y>x. The flared end is configured so that in operation a single mode signal propagating within the single mode fiber optic section is expanded within the flared end to an equilibrium mode distribution for propagation within a multimode fiber optic section to be coupled to the flared end. In an enhanced embodiment, the conditioner further includes a multimode fiber optic section having an end aligned to the flared end of the single mode fiber optic section. In one embodiment, the flared end of the single mode fiber optic section and the aligned end of the multimode fiber optic section are fusion spliced together. Further, the single mode fiber optic section may comprise any polymer material suitable for use as a fiber optic, i.e., a material that is transparent at an operational wavelength of the fiber optic channel.

In another aspect, a mode conditioning patch is provided which includes a single mode optical fiber section and a multimode optical fiber section. The single mode optical fiber section has a diameter x and a flared end, with the flared end having a diameter y, wherein y>x. The multimode optical fiber section has an end disposed in opposing relation to the flared end of the single mode optical fiber section. The flared end of the single mode optical fiber section is fabricated to expand a single mode signal propagating within the single mode optical fiber section to an equilibrium mode distribution for propagation within the multimode optical fiber section.

In a further aspect, the invention comprises a method for conditioning a single mode optical signal for propagation in a multimode optical fiber. The method includes: passing the single mode optical signal from a single mode optical fiber section, through a transition region optic and into a multimode optical fiber section, wherein the single mode optical fiber section has a diameter x and the multimode optical fiber section has a diameter Y, with y>x, and the single mode optical fiber section, the transition region and the multimode optical fiber section have an aligned axis; and wherein the transition region optic expands the single mode optical fiber signal to an equilibrium mode distribution for propagation within the multimode optical fiber section.

To restate, provided herein is an optical mode conditioning technique and mode conditioning patch which allows significantly smaller mode conditioners to be fabricated as compared with conventional MCPs. These significantly smaller mode conditioners do not measurably change an existing optical link length, and thereby maintain a constant delay through a fiber channel irrespective of whether a single mode or multimode channel is in use. Further, provided herein is an MCP adapter which is significantly less expensive to fabricate compared with a conventional MCP cable employing ceramic offset ferrules. Also, since there are no ceramic offset ferrules in the technique presented, no active alignment is needed.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
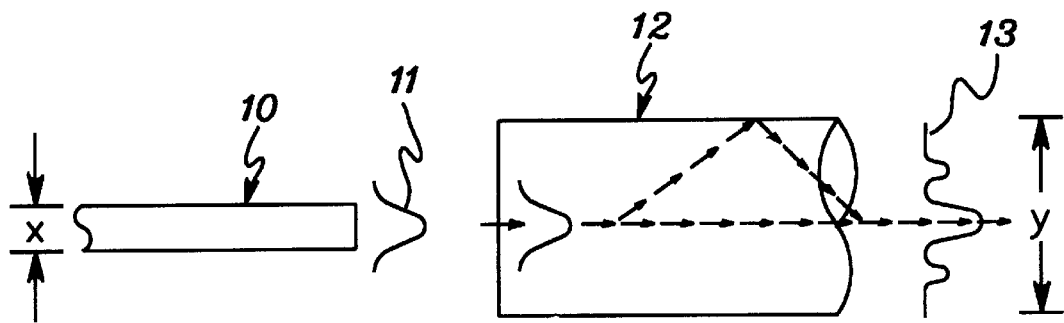
FIG. 1 depicts the conventional problem of launching a single mode optical signal propagating in a single mode fiber into a multimode optical fiber without conditioning.

Generally stated, this invention comprises a novel optical mode conditioner for conditioning a single mode signal for propagation within a multimode optical fiber. As background, in FIG. 1, a single mode laser signal 11 is shown propagating from a single mode fiber 10 into a multimode optical fiber 12. Once within the multimode fiber, the larger diameter of the multimode fiber results in the laser signal disintegrating into an uneven distribution among all the modes. This uneven distribution results in a differential mode delay (DVD) which prevents the multimode link from operating at any distance more than a few meters.

More particularly, upon entering the multimode fiber (which has a diameter y that is greater than the diameter x of the single mode fiber), some of the signal will fan out towards the edges of the fiber and then bounce back. This results in light propagating down the axis of the multimode fiber being delayed relative to light fanning out to the edges. The resulting optical power profile 13 often translates into bit errors since it is difficult to tell whether a 1 or 0 is being propagated.

Figure 2:
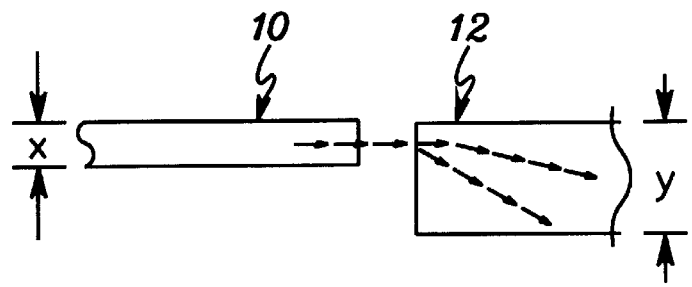
FIG. 2 is a prior art solution to mode conditioning which employs ceramic ferrules with their propagating axis offset as shown.

In order to achieve useful distances, the single mode transceiver card signal must be adapted to the multimode fiber. This is typically done using an optical mode conditioning patch (MCP) cable. Operation of the existing MCP cable is depicted in FIG. 2.

As shown, this MCP launches a single mode light source signal (e.g., a 10 $\mu$m diameter (x) spot of light) from the single mode optical fiber 10 into an edge of a 50 or 62.5 $\mu$m diameter (y) multimode cable 12, rather than into the core of the fiber. This misalignment of axis between the single mode fiber and multimode fiber results in a more uniform distribution of light among the modes within the multimode fiber and prevents DMD noise from occurring. However, the amount of offset between the ceramic ferrules is a critical factor in the existing MCP cable design of FIG. 2. For example, the current MCP cable requires precision alignment to tolerances of +/−1 $\mu$m.

Conventionally, the offset launch is achieved with a special ceramic ferrule aligned off-center with the light source. This is incorporated into a special fiber optic jumper cable that is at least 2 meters long, and which is plugged in between the single mode source and the multimode cable. The existing MCP requires the offset light to propagate for at least two meters in the multimode fiber in order to achieve the light energy distributed evenly among all the modes. This final state of the signal in the multimode fiber is referred to herein as an "equilibrium mode distribution". This distance provides sufficient dispersion for the uniform power distribution among the different modes. The prior art combination of the two effects (i.e., the offset ceramic ferrule launch, and the two meter propagation requirement after the offset launch) allows operation of single mode sources with multimode fibers at distances of several hundred meters or more.

Rather than use a two meter adapter cable which must be dressed under the covers of a system or switch, it is desirable to have a mode conditioner which is smaller in size, e.g., a plug-in adapter which could be inserted into a single mode transceiver card. To realize this using the conventional art would require some way to address the needs of the offset launch and dispersion of the optical power noted above. Further, it is not practical to coil conventional glass fiber into a tight spool because the minimum bend radius of glass fiber would be exceeded, resulting in dissipation of the signal. As described further below, this disadvantage is eliminated in the present invention by the use of plastic optical fiber, which has a much smaller bend radius before the fiber signal begins to degrade.

In accordance with the principles of the present invention, a novel technique for mode conditioning is provided which results in a plug-in size adapter and that uses plastic optical fiber. Plastic fiber has been developed by several fiber manufacturers as an alternative to optical glass fiber.

Advantageously, plastic fiber has a much higher dispersion than glass fiber. This means that mode mixing can be achieved with less than half a meter of plastic fiber, instead of two meters of glass fiber. Further, plastic fiber has a very low loss at very small bend radius. Thus, half a meter of plastic fiber can be coiled into a small package with perhaps a 10 mm bend radius and not suffer adverse effects, unlike glass fiber which cannot coil with a bend radius of less than 2–3 cm, and thus cannot be easily compressed into a small package.

Further, in accordance with the principles of the present invention, plastic fiber can be molded in a taper or flare, so that the diameter of at least one end is larger (or smaller) than the body of the fiber. As explained further below, this solves the need for an offset launch into multimode fiber since the single mode plastic fiber can be molded with a larger core on one end, for example, 100 $\mu$m, which can easily be aligned with an offset to a single mode fiber or to a transmitter designed to output a single mode signal, and the far end can be flared to match the 50 or 62.5 $\mu$m core of the existing multimode fiber.

Figure 3:
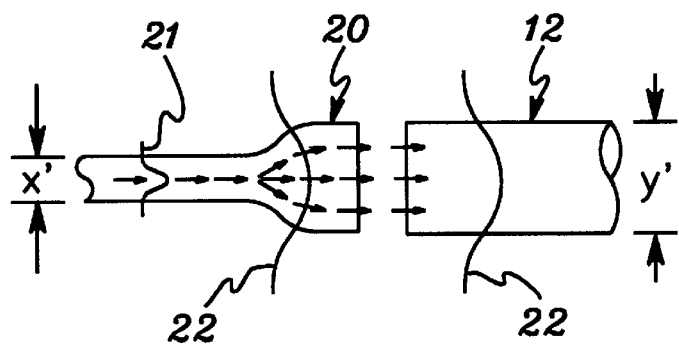
FIG. 3 depicts one embodiment of an optical mode conditioner in accordance with the principles of the present invention.

FIG. 3 depicts one embodiment of an optical mode conditioner in accordance with the principles of the present invention. This optical mode conditioner includes a single mode optical fiber 20 and a multimode optical fiber 12. The single mode optical fiber is fabricated of plastic and has in one embodiment a flared end as shown. In this embodiment, single mode optical fiber 20 has a diameter x', such as 9–10 $\mu$m, which increases at the flared end to a diameter y', which may for example be in the range of 50–62.5 $\mu$m. In operation, a laser signal 21 propagating within the single mode optical fiber is expanded by the flared end to an expanded uniform signal 22 which can propagate within the multimode fiber 12. This uniform signal 22 is referred to herein as an equilibrium mode distribution.

Light rays on the axis of the single mode fiber are already near the edges of the optical fiber core. These light rays remain near the edges of the core as they go into the flared, or tapered region presented herein. Within the flared or tapered region, the light rays gradually spread out until they are more uniformly distributed throughout the larger multimode core. The result is the desired equilibrium mode distribution. The desired optical intensity profile is a Gaussian mode distribution, similar to that obtained when a multimode light source is used with multimode fiber. The dispersion of the plastic fiber within the transition region determines how much the light rays will spread out when propagating through a given length of fiber at a given wavelength.

This invention proposes in one embodiment that a flared plastic optical fiber, for example, approximately 100 $\mu$m on a transmit line and 50 $\mu$m on a receive line of a duplex fiber optic link coiled into a package a few centimeters on a side, can be fabricated to replace the 2-meter long jumper cables used today for optical mode conditioning.

Figure 4:
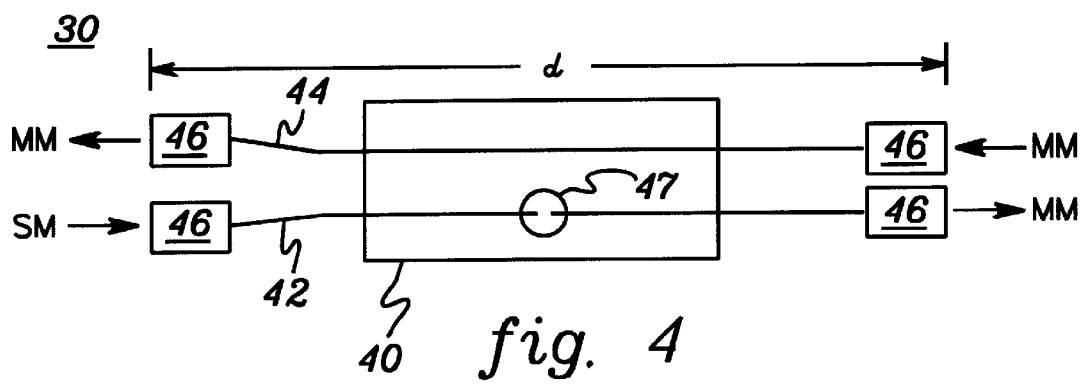
FIG. 4 depicts one embodiment of a mode conditioning cable adapter in accordance with the principles of the present invention.

FIG. 4 depicts one embodiment of an MCP cable, generally denoted 30, in accordance with the invention. Cable 30 has a protective housing 40 through which passes a transmit cable 42 and a receive cable 44. Optical connectors 46 reside at each end of the transmit cable and the receive cable. The optical receiver is not sensitive to the type of light being received, i.e., whether the light is received across a multimode or single mode fiber. In one embodiment, a single mode (SM) laser source is coupled through optical connector 46 into transmit line 42 for propagation into a multimode fiber. The receive cable could comprise a multimode link as shown. The overall length d of cable adapter 30 can be less than 1 meter, for example, ½ meter, and using plastic cable can be readily coiled into a small package size. The optical mode conditioner 47 resides, in this embodiment, within the transmit line 42 of the MCP cable adapter 30.

Figure 5:
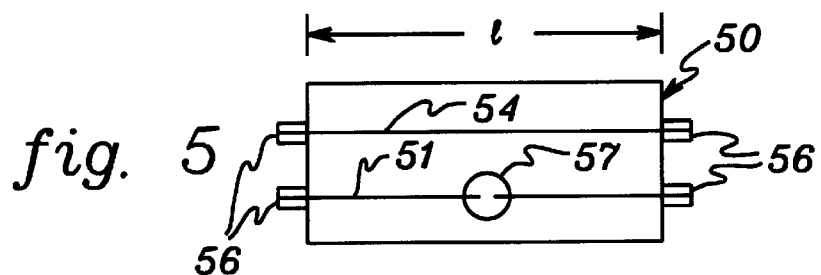
FIG. 5 depicts one embodiment of a mode conditioning plug-in adapter in accordance with the principles of the present invention.

Another embodiment of a mode conditioning patch adapter in accordance with the principles of the present invention is depicted in FIG. 5. In this embodiment, a mode conditioning plug-in type adapter 50 is presented. Adapter 50 may comprise, in one embodiment, a protective housing through which passes a transmit cable 51 and a receive cable 54, which again have optical connectors at their ends. When in use, transmit cable 51 receives a signal from a single mode laser source for conditioning and output to a multimode optical cable. The optical mode conditioner 57 could comprise a conditioner as described above in connection with FIG. 3. In one embodiment, the MCP plug-in adapter 50 can be fabricated by coiling the plastic fiber of an MCP adapter such as depicted in FIG. 4 into a small package, for example, with a 10 mm bend radius. The length L of the plug-in adapter could thus comprise any desirable length, for example, 1–5 cm in size.

One advantage of the plastic fiber mode conditioning plug-in embodiment of FIG. 5 is that it occupies significantly less space, making it easier to incorporate the adapter into the packaging of a processor or switch. Another advantage of a plug-in adapter as presented herein is that it can be easily removed or reinserted to allow the same card to operate over either single mode or multimode fiber. If a conventional jumper cable solution is used, then an additional 2 meters of fiber and one duplex coupler is added to the link when converting from single mode to multimode (and the excess fiber must be stored near the machine or dressed under the covers). Because of the high dispersion and low loss of plastic fiber, the plug-in adapter embodiment has improved performance over conventional solutions and enables operation of multimode fiber at longer distances. For example, current mode conditioners for IBM's Parallel Sysplex Links are limited to 550 meters, which is only about half the multimode specification of 1 km. Thus, certain customers with long links will not be able to seamlessly use the existing mode conditioners. A mode conditioner such as presented herein, which enables transmission over longer links, solves this problem. Because of its small size, a plug-in type mode conditioner would be more rugged than a cable-type conditioner. Since the plug-in mode conditioner can be made entirely of plastic, it should have a significant cost reduction over current solutions, which cost around $200 per link for two MCP cables using offset ceramic ferrules. Additionally, the plug-in mode conditioner does not require as precise an alignment as current MCPs using ceramic ferrules, which will also contribute to lower manufacturing costs.

Figure 6:
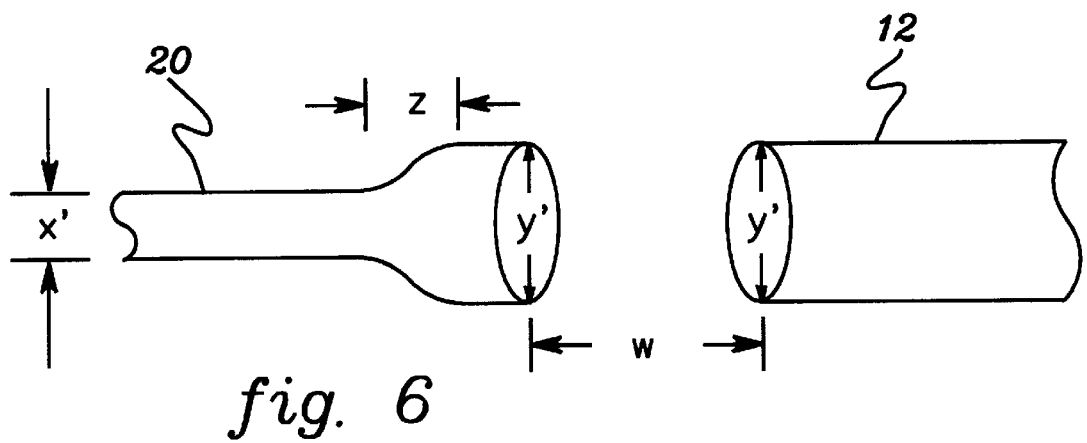
FIG. 6 depicts in greater detail one embodiment of an optical mode conditioner in accordance with the principles of the present invention for use within the adapters of FIGS. 4 & 5.

FIG. 6 depicts in greater detail one embodiment of an optical mode conditioner embodiment in accordance with the principles of the present invention. In this embodiment, the single mode optical fiber 20 has a transition region with a width z wherein the diameter of the single mode optical fiber flares from a diameter x' to a diameter y', with y' in this embodiment equaling the diameter of the multimode fiber 12 into which a single mode laser signal is to be propagated. In one embodiment, the single mode fiber and multimode fiber can be separated by a distance w. The transition region z can vary depending upon the implementation. As one example, the flared end of the single mode fiber may transition from diameter x' to diameter y' at a rate of approximately 10 $\mu$m/mm. However, this transition rate is provided by way of example only.

The single mode fiber 20 preferably comprises a plastic fiber, while fiber 12 may comprise a glass or plastic fiber. In the plug-in type adapter embodiment described above, both fibers are preferably plastic fibers fabricated of a polymer material that is transparent to light of the specified wavelength. Wavelengths of interest might be in the range of 1280–1310 nm or 1480–1650 nm. Plastic fiber examples include poly methyl methacrylate (PMMA), perfluorinated PMMA, and deuterated PMMA. The plastic fiber will have a bandwidth of about 200 MHz per 100 meters and the fiber type may be either step index or graded index. Dispersion of the fiber is preferably a minimum of 50 ps/nm-km, and may be much higher, for example, about 500 ps/nm-km. The numerical aperture preferably has a minimum of 0.20 to allow a flare from, for example, 9 $\mu$m diameter to 50 $\mu$m diameter fiber at a rate of 10 $\mu$m per mm, or a total length Z of the transition region of about 50 mm.

Note that a fiber taper or flare as described herein could be performed in the field, or prefabricated onto the plastic fiber cables as desired. Preferably, a fusion splice joint is used to couple the flared end of the single mode fiber to a multimode fiber. This too can be accomplished in the field with very high reliability due in part to the ease of alignment of the large core plastic fibers.

Figure 7:
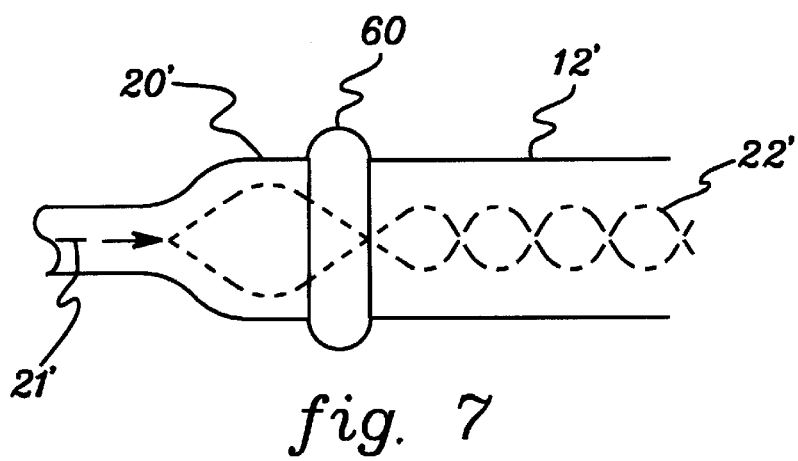
FIG. 7 depicts one embodiment of the optical mode conditioner of FIG. 6 wherein the single mode optical section and multimode optical section are fusion splice joined in accordance with the principles of the present invention.

FIG. 7 depicts one embodiment of a single mode fiber 20' fabricated in accordance with the principles of the invention. Fiber 20' is shown fusion splice joined 60 to a multimode fiber 12'. A single mode signal 21' propagating through the single mode fiber is expanded at the flared end of fiber 20' and then mixed through the fusion joint 60 to obtain a well mixed/scattered profile 22' for propagation across the multimode fiber. Again, the goal of the present invention is to spread out the single mode signal so that the signal has a uniform profile to fill the core of the multimode fiber. The fusion splice connection is facilitated by requiring that the single mode fiber comprise plastic fiber, as well as the multimode fiber. Fusion joining can be achieved by simply heating one or both of the fibers at their ends so that the two fibers melt together.

Alternatively, in order to promote a uniform mode profile (mode mixing) several bends can be introduced into the plastic fiber which comprises the MCP. For example, the MCP housing could be designed so that the multimode plastic fiber section after the fusion splice has two or more small bends incorporated therein. If the multimode fiber comprises glass fiber, these bends would have a bend radius of several inches, so that they do not introduce excessive loss into the fiber. The purpose is to encourage light rays to be mixed more evenly between the different modes of the multimode fiber, thus attaining the desired uniform mode distribution.

To summarize, presented herein is a mode conditioning patch and method for conditioning a single mode optical fiber signal for propagation in a multimode optical fiber. The MCP includes a single mode optical fiber section having a diameter x and a flared end, with the flared end having a diameter y, wherein y>x. The flared end of the single mode optical fiber section is fabricated to expand a single mode signal propagating within the single mode optical fiber section to an equilibrium mode distribution for propagation within a multimode optical fiber section.

By way of example, the MCP can be inserted between either a single mode laser transmitter and a glass multimode fiber optic cable, or between a single mode glass fiber and a multimode glass fiber cable. This MCP adapter contains plastic fiber, but has connectors at each end which plug into the transceiver and the glass fiber cable. The MCP adapter itself may either be a short piece of cable (e.g., 0.5 meters long), with the flare and splice in the middle, or a very small (e.g., several centimeters) plug-in module with connectors on both sides.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An optical mode conditioner comprising:
    a single mode optical fiber section having a diameter x and a flared end, said flared end having a diameter y, wherein y>x;
    wherein said flared end of said single mode optical fiber section is fabricated to expand a single mode signal propagating within said single mode optical fiber section to an equilibrium mode distribution for propagation within a multimode optical fiber section; and
    wherein said single mode optical fiber section has a minimum dispersion of 50 ps/nm-km.

2. The optical mode conditioner of claim 1, wherein said single mode optical fiber section comprises plastic.

3. The optical mode conditioner of claim 2, wherein said diameter x is in a range of 9–10 $\mu$m and said diameter y is in a range of 50–62.5 $\mu$m.

4. The optical mode conditioner of claim 3, wherein said flared end of said single mode optical fiber section comprises a transition region where said diameter x transitions to said diameter y, said single mode optical fiber section having a diameter within said transition region which changes at a rate of approximately 10 $\mu$m/mm.

5. The optical mode conditioner of claim 2, wherein said plastic comprises a poly methyl methacrylate.

6. The optical mode conditioner of claim 1, wherein said flared end of said single mode optical fiber section comprises a transition region of increasing diameter where said single mode optical fiber section transitions from said diameter x to said diameter y.

7. A mode conditioning patch comprising:
    a single mode optical fiber section having a diameter x and a flared end, said flared end having a diameter y, wherein y>x;
    a multimode optical fiber section having an end disposed in opposing relation to said flared end of said single mode optical fiber section, wherein said flared end of said single mode optical fiber section is fabricated to expand a single mode signal propagating within said single mode optical fiber section to an equilibrium mode distribution for propagation within said multimode optical fiber section; and
    wherein said single mode optical fiber section comprises plastic; and
    wherein said flared end of said single mode optical fiber section and said opposing end of said multimode optical fiber section are fusion splice joined.

8. A mode conditioning patch comprising:
    a single mode optical fiber section having a diameter x and a flared end, said flared end having a diameter y, wherein y>x;
    a multimode optical fiber section having an end disposed in opposing relation to said flared end of said single mode optical fiber section, wherein said flared end of said single mode optical fiber section is fabricated to expand a single mode signal propagating within said single mode optical fiber section to an equilibrium mode distribution for propagation within said multimode optical fiber section; and
    wherein said single mode optical fiber section has a minimum dispersion of 50 ps/nm-km.

9. The mode conditioning patch of claim 8, wherein said single mode optical fiber section comprises plastic.

10. The mode conditioning patch of claim 9, wherein said multimode optical fiber section comprises plastic or glass.

11. The mode conditioning patch of claim 9, wherein said plastic comprises a poly methyl methacrylate.

12. The mode conditioning patch of claim 9, wherein said diameter x is in a range of 9–10 $\mu$m and said diameter y is in a range of 50–62.5 $\mu$m.

13. The mode conditioning patch of claim 9, wherein said flared end of said single mode optical fiber section comprises a transition region of increasing diameter where said single mode optical fiber section transitions from said diameter x to said diameter y.

14. The mode conditioning patch of claim 13, wherein said diameter increases at a rate of approximately 10 $\mu$m/mm within said transition region.

15. A mode conditioning patch comprising:
    a single mode optical fiber section having a diameter x and a flared end, said flared end having a diameter y, wherein y>x;
    multimode optical fiber section having an end disposed in opposing relation to said flared end of said single mode optical fiber section, wherein said flared end of said single mode optical fiber section is fabricated to expand a single mode signal propagating within said single mode optical fiber section to an equilibrium mode distribution for propagation within said multimode optical fiber section; and wherein said multimode optical fiber section has said diameter y, and wherein an axis of said single mode optical fiber section is aligned to an axis of said multimode optical fiber section.

16. A mode conditioning patch comprising:

a single mode optical fiber section having a diameter x and a flared end, said flared end having a diameter y, wherein y>x;

a multimode optical fiber section having an end disposed in opposing relation to said flared end of said single mode optical fiber section, wherein said flared end of said single mode optical fiber section is fabricated to expand a single mode signal propagating within said single mode optical fiber section to an equilibrium mode distribution for propagation within said multimode optical fiber section; and wherein said mode conditioning patch resides within a transmit line of a mode conditioning adapter.

17. The mode conditioning patch of claim 16, wherein said transmit line comprises an optical connector at each end thereof, said mode conditioning patch residing between said optical connectors.

18. The mode conditioning patch of claim 17, wherein said mode conditioning adapter comprises a mode conditioning cable adapter, said mode conditioning cable adapter being less than 1 meter in length.

19. The mode conditioning patch of claim 17, wherein said mode conditioning adapter comprises a mode conditioning plug-in adapter, said mode conditioning plug-in adapter being less than 10 cm in length.

20. A method for conditioning a single mode optical signal for propagation in a multimode optical fiber, said method comprising:

passing said single mode optical signal from a single mode optical fiber section, through a transition region and into a multimode optical fiber section, wherein said single mode optical fiber section has a diameter x and said multimode optical fiber section has a diameter y, wherein y>x, and wherein said single mode optical fiber section, said transition region and said multimode optical fiber section have aligned axes;

wherein said transition region expands said single mode optical signal to an equilibrium mode distribution for propagation within said multimode optical fiber section; and wherein said single mode optical fiber section has a minimum dispersion of 50 ps/nm-km.

21. The method of claim 20, wherein said transition region comprises a flared end of said single mode optical fiber section.

22. The method of claim 21, wherein said single mode optical fiber section with said flared end comprises plastic.

23. The method of claim 20, wherein said transition region is integral with one of said single mode optical fiber section or said multimode optical fiber section.

24. A method for conditioning a single mode optical signal for propagation in a multimode optical fiber, said method comprising:

passing said single mode optical signal from a single mode optical fiber section, through a transition region and into a multimode optical fiber section, wherein said single mode optical fiber section has a diameter x and said multimode optical fiber section has a diameter y, wherein y>x, and wherein said single mode optical fiber section, said transition region and said multimode optical fiber section have aligned axes;

wherein said transition region expands said single mode optical signal to an equilibrium mode distribution for propagation within said multimode optical fiber section; and wherein said transition region comprises a tapered end of said multimode optical fiber section.

* * * * *